United States Patent Office 3,210,365
Patented Oct. 5, 1965

3,210,365
PROCESS FOR PRODUCING BIPYRIDYLS
Frank Raymond Bradbury and Alastair Campbell, Widnes, England, assignors to Imperial Chemical Industries Limited, Millbank, London, England, a corporation of Great Britain
No Drawing. Filed Sept. 6, 1962, Ser. No. 221,902
Claims priority, application Great Britain, Sept. 12, 1961, 32,714/61
11 Claims. (Cl. 260—296)

This invention relates to an oxidation process for the manufacture or organic bases, more particularly 4:4'-bipyridyl.

4:4'-bipyridyl is a valuable intermediate for the manufacture of herbicidal products and is commonly made, in conjunction with varying proportions of isomeric materials, by oxidation of the product obtained by interaction of sodium and pyridine. An alternative method, described in U.S. application Serial No. 193,627, filed May 9, 1962, is that of oxidising the interaction product of magnesium and pyridine. In both these methods, it has been the usual practice hitherto to oxidise the metal-pyridine interaction product with air or oxygen, since this affords a cheap method and also has been regarded as a suitable way of controlling the vigorous oxidation reaction.

Oxidation by a gaseous oxidising agent has several disadvantages, however, including in particular the explosion and fire hazard which can arise from the formation of hot mixtures containing oxygen and organic vapours (for example from the hydrocarbon diluents employed) in the reaction vessels. This hazard is increased by the possible presence of finely divided metal. Furthermore, the large volume of nitrogen associated with the oxygen, or added to reduce fire hazard, reduces the efficiency of the condensers used in the process.

According to the present invention there is provided an improved process for the manufacture of bypyridyls wherein a metal-pyridine interaction product is treated with a water-soluble inorganic peroxy compound.

The reaction which takes place is vigorous but, surprisingly, is very readily controlled and does not lead to additional formation of undesired by-product from the pyridine. The yield of bipyridyls is good and the disadvantages of the earlier oxidation methods are avoided without loss of yield of product. Also, the products to which the peroxy compounds are converted during the reaction are substantially all gaseous or water-soluble and so are very readily eliminated in subsequent isolation procedures.

The metal-pyridine interaction product may be in particular a sodium-pyridine interaction product, which may be prepared in known manner by mixing finely divided sodium with pyridine in an inert diluent for example xylene or petroleum spirit. There may also be used a magnesium-pyridine interaction product, which may be prepared in the manner described in co-pending application Serial No. 193,627 by interacting magnesium metal with pyridine, preferably in the presence of a small proportion of an initiator which may be in particular a material which can induce the formation of free radicals in the magnesium-pyridine mixture, for example iodine, bromine, or finely divided sodium or potassium. There may also be used an aluminium-pyridine interaction product which may be prepared by interacting aluminium metal with pyridine preferably in the presence of an initiator for example a material which can initiate a magnesium-pyridine interaction and/or a material which can clean the metal by breaking down the surface oxide film (particularly a mercury compound, for example mercuric chloride).

The pyridine used in the formation of the metal-pyridine interaction product should be as free as possible from any substituent or impurity (for example piperidine) which can take part in any undesirable side-reaction with the metal (or the initiator, when one is used). The process of our invention is especially applicable to interaction products derived from pyridine itself. Pyridines containing hydrocarbon radicals (particularly alkyl radicals, for example methyl and/or ethyl radicals) may also be used, for example picolines and lutidines; as these are less reactive than pyridine itself, however, they are better used as alkali metal interaction products.

Commonly a mixture of isomeric bipyridls is produced by the process of the present invention, the principal constituents being the 2:2'-, 2:4'- and 4:4'-isomers or such of these as are permitted by the structure of the pyridine used as starting material in making the metal-pyridine interaction product. The 4:4'-isomer usually predominates.

The most convenient water-soluble inorganic peroxy compound for use in our process is hydrogen peroxide, as it is liquid and the water formed from it in the reaction causes least interference with subsequent isolation procedures. Hydrogen peroxide commonly may be used as a solution in water because the pure material is not very convenient to handle and may even be dangerous. In general, hydrogen peroxide as a 10% to 50% solution in water (by weight) is most reliable and safe. Solutions in other diluents may be used, provided that the peroxide and diluent can safely be mixed.

Other water-soluble inorganic peroxy compounds which may be used include materials which can give rise to hydrogen peroxide in solution, per-acids and their salts, and substances containing hydrogen peroxide of crystallisation. Examples of such compounds include sodium peroxide, sodium perborate, sodium percarbonate and ammonium persulphate. If these compounds are used, they are preferably used as aqueous solutions or slurries, particularly when the compound liberates significant amounts of heat on mixing with water (for example sodium peroxide).

The proportion of peroxy compound to be used is usually at least 0.5 mole, and preferably between 0.8 and 1.2 moles, for each equivalent of metal used in making the metal-pyridine interaction product. Larger proportions may be used if desired, however.

The peroxy compound reacts immediately and the vigorous reaction can readily be controlled by adding the peroxy compound at such a rate that the reaction is maintained. Most conveniently, the reaction may be carried out in reflux apparatus, the peroxy compound being added gradually to the stirred reaction mixture at such a rate that the mixture boils steadily and the condensing system is not overloaded.

The isolation of bipyridyls from the reaction mixture can be carried out by conventional techniques, for example fractional distillation, extraction with acid and treatment of the acid extracts with alkali, fractional crystallisation, and combinations of such techniques. The mixture of isomeric bipyridyls may be used as such, or may be separated by the known methods in order to obtain individual isomers, particularly 4:4'-bipyridyl, in a substantially pure state.

The process of the present invention has the advantage of rapid, smooth and complete reaction while retaining ease of control. This is especially important in commercial operation, as production from a given installation can be increased and the process is suitable for continuous operation. Moreover, the explosion and fire hazard are very greatly reduced because the large volumes of gaseous oxidizing medium previously required are now avoided and the reaction can be carried out in an inert atmosphere, for example under nitrogen. The losses of material and the cost of refrigeration, resulting from the large flow of gases in the prior art processes, are also largely eliminated, and the cost and complexity of the isolation procedure is greatly reduced by the fact that most of the inorganic by-products are in gaseous or water-soluble form.

The invention is illustrated but not limited by the following examples in which the parts and percentages are by weight.

*Example 1*

6 grams of magnesium turnings and 186 grams of pyridine were mixed and reaction was started by addition of 1 gram of a dispersion of sodium in trimethylbenzene, containing 33% of sodium metal. The mixture was then stirred and boiled under reflux conditions in a stream of nitrogen for 5 hours. The reaction mixture was then oxidised by gradual addition of 13 ml. of an aqueous solution of hydrogen peroxide (30% weight/volume) during 20 minutes while the temperature of the mixture was maintained at 80° C. The product was found by analysis to contain 56.4% pyridine, 0.6% 2:4'-bipyridyl and 10.4% 4:4'-bipyridyl. The yield of bipyridyls was 33% of theory based on the pyridine consumed, or 64.5% of theory based on the magnesium consumed.

*Example 2*

The procedure of Example 1 was repeated except that the reaction mixture was maintained at 60° C. while the oxidation by the addition of hydrogen peroxide was carried out. The yield of 4:4'-bipyridyl was 22% of theory based on the pyridine consumed or 46% of theory based on the magnesium consumed.

*Example 3*

The procedure of Example 1 was repeated except that the reaction mixture was maintained at boiling point under reflux conditions while the oxidation by the addition of hydrogen peroxide was carried out.

The yield of 4:4'-bipyridyl, based on the magnesium consumed, was 57% of theory.

*Example 4*

Sodium metal (11.5 parts, 0.5 atomic proportion), as a 33% dispersion in trimethylbenzene, was added to pyridine (316 parts, 4 moles) during 20 minutes while the mixture was maintained at 90° to 95° C. The mixture was stirred for a further 30 minutes and then hydrogen peroxide (25 parts of an aqueous 30% solution) were added while the whole was maintained at 90° to 95° C. The resulting product (weighing 373 parts) was found by analysis to contain 52% pyridine, 0.2% of 2:2'-bipyridyl, 1.4% of 2:4'-bipyridyl and 8.6% of 4:4'-bipyridyl. The efficiency of formation of 4:4'-bipyridyl was 26% of theory based on the pyridine consumed.

What we claim is:

1. A process for the manufacture of bipyridyls selected from the group consisting of unsubstituted bipyridyls and the alkyl derivatives thereof, said process comprising treating with hydrogen peroxide a metal-pyridine interaction product obtained by reacting a metal with a compound selected from the group consisting of pyridine itself and alkyl-substituted pyridine.

2. Process as claimed in claim 1 wherein said compound is pyridine.

3. Process as claimed in claim 1 wherein said hydrogen peroxide is formed in situ.

4. A process for the manufacture of bipyridyl which comprises reacting sodium with pyridine and then oxidizing the resulting sodium-pyridine interaction product by gradually adding hydrogen peroxide thereto while maintaining the resulting reaction mixture at a temperature from 60° C. to the boil.

5. Process as claimed in claim 4 wherein the proportion of hydrogen peroxide is between 0.8 and 1.2 moles for each equivalent of sodium used in making the sodium-pyridine interaction product.

6. Process as claimed in claim 5 wherein said hydrogen peroxide is formed in situ.

7. Process as claimed in claim 1 wherein the proportion of hydrogen peroxide is at least 0.5 mole for each equivalent of metal used in making the metal-pyridine interaction product.

8. Process as claimed in claim 7 wherein the proportion of hydrogen peroxide is between 0.8 and 1.2 moles for each equivalent of metal used in making the metal-pyridine interaction product.

9. Process as claimed in claim 8 wherein the metal-pyridine interaction product is a sodium-pyridine interaction product.

10. Process as claimed in claim 8 wherein the metal-pyridine interaction product is a magnesium-pyridine interaction product.

11. Process as claimed in claim 8 wherein the metal-pyridine interaction product is an aluminium-pyridine interaction product.

References Cited by the Examiner

UNITED STATES PATENTS 2,773,063  12/56  Linnell et al. _____ 260—296

FOREIGN PATENTS 870,700  6/61  Great Britain.

WALTER A. MODANCE, *Primary Examiner.*

NICHOLAS S. RIZZO, *Examiner.*